United States Patent [19]

Griffiths

[11] 3,925,532
[45] Dec. 9, 1975

[54] PROCESS FOR MANUFACTURING ALUMINUM SULFATE

[76] Inventor: Kenneth F. Griffiths, 21 N. Chatsworth Ave., Larchmont, N.Y. 10538

[22] Filed: Feb. 11, 1974

[21] Appl. No.: 441,128

[52] U.S. Cl. ............................... 423/132; 423/556
[51] Int. Cl.$^2$ .......................................... C01F 7/74
[58] Field of Search ........... 423/111, 128, 132, 556; 23/295, 300, 305

[56] References Cited
UNITED STATES PATENTS

| | | | |
|---|---|---|---|
| 1,176,292 | 11/1912 | Hersman | 423/556 |
| 2,033,055 | 3/1936 | Valik | 423/111 |
| 2,402,668 | 4/1942 | Roller | 23/300 |
| 2,686,159 | 8/1954 | Webb et al. | 423/111 |
| 2,846,305 | 8/1958 | Ashley et al. | 423/132 |
| 3,119,658 | 12/1960 | Schulz | 423/111 |

Primary Examiner—Oscar R. Vertiz
Assistant Examiner—Gary P. Straub
Attorney, Agent, or Firm—Murray Schaffer

[57] ABSTRACT

There is disclosed a process for manufacturing high purity aluminum sulfate by reacting aluminum containing metal impurities with sulfuric acid in the presence of liquid mercury. During the reaction period, the metallic impurities in the aluminum are absorbed into the mercury and the aluminum sulfate produced. The impurity containing mercury is thereafter separated from the aluminum sulfate product. If further desired the impurities may be separated from the mercury and the thus purified mercury is, in a preferred embodiment, recycled to the reaction zone.

18 Claims, No Drawings

PROCESS FOR MANUFACTURING ALUMINUM SULFATE

The present invention relates to the production and recovery of aluminum sulphate and basic aluminum sulphate by the reaction of aluminum metal with sulfuric acid. More specifically the invention relates to an improved method of producing aluminum sulphate which is purer than the aluminum metal reactant from which the same has been made.

The process contemplates carrying out the reaction in the presence of liquid mercury, the latter being operative to function as a "pool" to absorb the impurities from the aluminum metal. The process may be carried out on a batch basis or continuously.

Large tonnages of ultra pure aluminum sulphate, basic aluminum sulphate and mixtures thereof are required as a primary reactant in the production of ultra pure aluminum oxide. Such oxide is employed for the production of sodium vapor lamp envelopes and many other products.

Impurities such as iron, chromium, manganese, cobalt and other light absorbing elements must be kept at extremely low levels in the aluminum oxide employed for example, in sodium lamp envelopes. Therefore, the aluminum sulphate employed for the production of such oxide must be over 99.99% pure and preferably be over 99.995% pure.

It is accordingly an object of the invention to provide for a process which permits less pure aluminum metal to be employed as a reactant for the production of an ultra pure aluminum sulphate product.

It is another object of the invention to increase the reaction rate of pure aluminum with sulfuric acid solutions.

It is a further object of the invention to permit commercial-sized, ultra-pure aluminum ingots to be employed directly as a reactant in producing ultra-pure aluminum sulfate.

It is still another object of the invention to permit substantially all of the sulfuric acid present in the reactor to react with the aluminum within a reasonably short time.

It is yet a further object of the invention to lower the cost of producing ultra-pure aluminum sulfate from the reaction of pure aluminum with pure sulfuric acid.

These and other objects and advantages of the invention will become more apparent from the following detailed disclosure and claims.

Broadly speaking the invention includes the provision of a process for the production of aluminum sulfate comprising reacting in a reaction zone aluminum with sulfuric acid in the presence of liquid mercury, said mercury being operative to absorb metallic impurities freed from said aluminum by said reaction.

As can be seen, the invention advantageously employs liquid mercury for the purpose of absorbing metallic impurities from the reacting aluminum. Such absorbtion or transference of impurities results in the production of aluminum sulfate which is purer than the reacting aluminum metal. In the practice of the invention, the percentage concentration of metallic impurities, which are more electropositive or less active than aluminum, is lower in the aluminum sulphate product than in the aluminum metal reactant.

It is preferred that the reacting aluminum metal be in contact with a pool of mercury of maximum possible purity. As the aluminum is consumed in the reaction with the sulfuric acid solution, the metallic impurities tend to concentrate in the mercury pool.

It is of course to be understood, that the procedure may also be carried out employing impure mercury. The contaminated mercury may be left in the reactor vessel until the completion of a run (i.e., until conversion of all the aluminum sulphate is completed and removed) and thereafter purified in the reactor vesel prior to the introduction of new reactants and of a subsequent run. After purification the then purified mercury could be employed in the next run.

If desired, the mercury may be removed batchwise, after each run, purified externally and then returned to the vessel. It is also possible to remove mercury continuously from the reactor or reaction zone during the reaction period, purify it in an area outside of the reactor and return it thereto to the reactor vessel, all during a single run. Conventional means may be provided such as contoured belts, moving basins, pipe and pump systems and the like to effect the purification in any alternative. All of these means are well known in the art and need not be described in detail herein.

It is desirable to have conditions in the reactor such that the reacting aluminum metal is in contact with a pool of mercury during substantially all of the reaction period. It may be observed that in some instances when a mercury-wet chunk of reacting aluminum becomes separated, for one reason or the other from the pool of mercury in the bottom of the ractor, it goes into a passive state of ceasing to react with the sulfuric acid solution. Such chunk may achieve this passive state while other chunks of aluminum in contact with the mercury pool continue to react with vigorous evolution of hydrogen. A mercury-wet chunk of pure aluminum not in contact with the mercury pool and not reacting therewith can be brought to a state of rapid reaction with the sulfuric acid by merely moving it into re-contact with the pool of mercury at the bottom of the reactor.

The weight ratio of the mercury to that of the aluminum is substantially not critical to the operation of the invention with the exception that there should be sufficient mercury present to substantially always allow a pool of mercury to be in substantial contact with the reacting aluminum. It is preferred that there be enough mercury in the reactor to form a pool of sufficient size to render it difficult for the reacting aluminum to become separated therefrom. Preferably the pool of mercury should cover the entire bottom portion of the reactor. The foregoing renders it practically impossible for any chunks of reacting aluminum to become disengaged from contact with the mercury pool. The foregoing is dictated by the size of the reaction zone and the size and quantity of aluminum chunks passing there through, all of which are within the knowledge of the skilled artisan.

In order to conserve mercury, it is preferred that the bottom of the reactor be as flat as possible, through it is not necessary. It is to be understood that practically any shape of reactor may be employed in carrying out the process. It is preferred, however, that the shape of the reactor and of mercury pool be such that any reacting chunks of aluminum substantially remain in contact with the pool during the entire reaction period. Usually, hydrogen gas is produced rapidly enough to maintain the reaction solution in moderate agitation. Therefore, it is desirable that there be no locations or areas in the reactor which would be remote from the mercury pool, and to where chunks of aluminum, may be swept out of the way reaction by currents.

If is also to be understood that while an agitated medium is preferred, it is not absolutely necessary. Where agitation is employed, same may be created artifically by means known in the art. The agitation may also be provided from the bottom of the pool, by rocking the entire bath, by an undercurrent or by means creating the same above the new face thereof. It is preferred that the sulfuric acid employed be sufficiently dilute so that the by-product of the reaction is hydrogen rather than sulfur dioxide. It will be observed that when the sulfuric acid is sufficiently dilute to allow the production of hydrogen rather than sulfur dioxide as the by-product the mercury does not react therewith. It is preferred that the concentration of sulfuric acid be between about 20 and about 70% by weight with the most preferred concentration being about 30 to about 40%.

It is also preferred that the reaction take place at approximately the boiling point of the sulfuric acid reactant mixture. By the foregoing, it is meant the boiling point of the entire aqueous reacting solution, sulfuric acid. At atmospheric pressure, this temperature is approximately 110°C to 125°C, depending upon the concentration of unreacted sulfuric acid and aluminum sulphate in the solution.

The reaction may in some cases, be carried out at sub-stmospheric or super-atmospheric pressures as well, with changes in temperature to facilitate the modification. It is, however, generally contemplated that the invention be carried out under conditions of temperature and pressure conducive to the evolution of a hydrogen by-product at a reasonable controlled rate. Usually, the evolution of steam may serve advantageously to prevent the very exothermic reaction from overheating the reactor. The mixture of steam and hydrogen evolving from the reactor may be passed through a reflux condenser and the water condensate returned to the reactor, if desired.

The ratio of aluminum to acid may be such that all of the aluminum is converted into aluminum sulphate and only a minimum quantity of unreacted acid is left over. In other cases, the ratio may be such that all of the acid may be consumed before oxidation of all of all of the aluminum so that at least a portion of the aluminum may be converted into basic aluminum sulphate rather than aluminum sulphate. Generally, the ratio of aluminum to acid may be selectively varied to produce either a solution of aluminum sulphate containing some free acid or a solution of aluminum sulphate containing a quantity of basic aluminum sulphate. When it is desired to produce aluminum sulphate, it is desirable to employ just sufficient sulfuric acid to convert all of the aluminum to aluminum sulphate. On the other hand, when it is desired to produce a mixture of aluminum sulphate and basic aluminum sulphate of a definite weight percentage of each, a calculated weight of sulfuric acid is employed according to standard stoichiometric formulae, to produce the desired percentages.

In the practice of the invention, there is substantially no limitation as to the order in which the mercury, sulfuric acid solution and aluminum are added to the reactor. At the start of a run, the aluminum may be added to the reactor first, then the acid and then the mercury. On the other hand, the mercury may be added first, then the acid and then the aluminum. In other cases, the acid and the aluminum may be added first and then the mercury.

Once the mercury, aluminum and acid are in the reactor, the reaction may be started by merely heating the reactor. The visible evolution of hydrogen will commence as the temperature of the reactants reaches approximately 50° to 90°C. Where desired, further heating will greatly increase the rate of evolution of hydrogen. Usually, the heat liberated from the reaction will bring the acid solution to a brisk boil.

It is preferred to employ either deionized or distilled water as the acid diluent for the reaction although it is not necessary. Also, reagent grade or redistilled sulfuric acid is preferred as the acid reactant. Obviously, it is highly desirable to minimize the introduction of impurities into the aluminum sulfate product from the source of impurities contained in the water and the sulfuric acid employed as reactor feed.

The aluminum metal feed material may be of any purity sufficiently high enough to permit the production of aluminum sulfate of the required purity. The present invention may be employed in cases in which commercial purity aluminum is employed as feed. However, in many cases, electrolytically refined aluminum of either 99.9 or even 99.99% purity may be employed as the reactor feed.

While not wishing to be bound by any particular theory or chemical mechanism, it appears as though most of the metallic impurities in the aluminum are absorbed onto the mercury either in the form of an amalgam or a true solution. In either case, such impurities may if desired be removed from the mercury by subsequent distillation.

In carrying out the invention, a pool of mercury may be maintained at all times in the reactor as a substantially permanent part thereof. It is possible here to make no attempt to remove any mercury from the reactor between runs. However, the solution of aluminum sulphate product is generally removed from the reactor at the conclusion of each run where a batch process is carried out. After each such such removal, the contaminated mercury retained in the reactor is treated with a quantity of purifying agent such as hot dilute nitric acid or the like. The purifying agent can be, if desired, agitated with the mercury for the purpose of absorbing, i.e., reacting with impurities from the mercury. After the purifying agent has absorbed impurities from the mercury, that agent is removed from the reactor. The purified mercury, will then be the sole substance remaining in the reactor, and can thus be available for absorbing impurities during the next run. On the other hand, the contaiminated mercury may be removed batch wise from the reactor after each run, removed continuously in part during each run, so that the removed portion may be pruified and thereafter returned to the reactor for use in the next run iri the same run, respectively.

The purifying agent may be any substance, such as an acid, capable of absorbing metallic impurities from mercury. In most cases, the purifying agent will be capable of oxidizing metallic impurities into the form of water soluble metallic salts which will be retained in the purifying agent. In addition to nitric acid, other suitable substances for this purpose include, dilute or concentrated sulfuric acid or other strong acids capable of purifying mercury.

Means may, if desired, be provided for metering predetermined portions of reactants to the reaction zone.

The following examples are offered by way of illustrations only and are not to be considered as limiting the scope of the invention. All parts, proportions and ratios therein, as well as in the appended claims are by weight unless otherwise indicated.

EXAMPLE 1.

A "Kel-F" lined, stainless steel tank having a 40 cm. diameter and a height of 80 cm. as employed. The bottom of the tank is flat and level. This tank has its lower portion immersed in an oil bath which is provided with a thermostatically controlled heating means. Thus the bath and tank can be maintained at a temperature as high as 130°C. The tank is also provided with a removable cover in order to allow aluminum ingots, mercury, water and sulfuric acid to be charged into it. A conduit suitable for leading steam and hydrogen from the upper portion of the tank to a reflux condenser is also provided. Also, a conduit suitable for withdrawing mercury from the bottom of the tank to a mercury still outside of the tank is provided.

An aluminum ingot of 99.98% purity containing 40 ppm of copper, 40 ppm of iron and 120 ppm of other metallic impurities and weighing 3000 grams is placed in the bottom of the tank. Approximately 30 liters of distilled water is then poured into the tank. After this, 9.30 liters of concentrated, reagent grade sulfuric acid is poured into the water. At this time, there is no visible reaction between the acid and the aluminum. The contents of the tank are heated by means of the oil bath, to the boiling point of the acid. Even when the acid is boiling, there is hardly a perceptible reaction between the aluminum and the acid.

11 kilograms of distilled mercury are now poured into the tank. The resulting mercury pool covers the entire bottom of the tank to a depth of approximately 0.6 cm. Within several seconds, the mercury wets the ingot and the visible evolution of hydrogen commences. Within a few minutes, the rate of production of hydrogen is sufficient to maintain the acid in a stirred condition. Immediately after the introduction of the mercury into the reactor, the cover is placed over the tank. Shortly after the reaction starts, a mixture of hydrogen and steam commences to flow from the reactor into the reflux condenser. Water condensate flows back to the reactor and hydrogen issues from the other end of the condenser to an area separate from the reactor and condenser.

In this example, all of the aluminum dissolves within 24 hours. At the end of the 24 hour period, the mercury is removed from the reactor and distilled in a Pyrex flask provided with controlled heating means. After the mercury is distilled from the flask, the bottom of the flask contains a residue of several hundred milligrams of a mixture of copper, iron and other base metals. A spectographic analysis of the aluminum sulphate product from the above-mentioned run shows less than 10 ppm of copper and less than 10 ppm of iron.

The distilled mercury product from the above mentioned Pyrex flask is then employed for a run identical to the one just described. Analysis of the aluminum sulfate produced in the second run is substantially the same as that of the first.

EXAMPLE 2

The same apparatus as used in Example 1 is herein employed. However, a conduit is furnished which leads from the bottom of the reactor to the lower portion of a Pyrex flask. This conduit serves as an inverted syphon which is positioned so as to allow the level of the mercury in the flask to be the same as in the reactor.

At the beginning of the run, sufficient heat is applied to the flash to vaporize approximately 10 kilograms per hour of mercury from it. The mercury vapor is condensed in a suitable Pyrex condenser located above the Pyrex flask. The mercury condensate is then allowed to flow back to the reactor through a suitable conduit leading from the discharge end of the condenser to the reactor. The inverted syphon serves to allow mercury to flow from the reactor to the flash and maintain a contant level of mercury in the flask.

In this example, the aluminum is completely consumed in the reaction within 24 hours. Also, the distillation of the mercury in the flask is continued for the same 24 hour period.

Spectrographic analysis of the aluminum sulphate produced in this example shows that there is less than 10 ppm of copper and less than 10 ppm of iron in it.

EXAMPLE 3

With the same apparatus and procedure as used in Example 1 the same quantity of reactants as were employed, with the exception that an aluminum ingot weigthing 3500 grams instead of 3000 grams was used, thereby reducing the ratio of sulfuric acid to aluminum. The reaction time lasted approximately 48 hours and the final product was a solution containing a major portion of aluminum sulphate and a minor portion of basic aluminum sulphate.

The concentration of metallic impurities in the mixture of aluminum sulphate and basic aluminum sulphate was approximately the same as in Example 1. After the water was evaporated from the aluminum sulphate produced in this example, it was employed for the production of high purity aluminum oxide by conventional procedures.

Although the invention has been described with reference to certain specific examples, it will be apparent to those skilled in the art that various modifications may be made thereto which fall within its scope.

What is claimed is:

1. A process for the production of a substantially pure aluminum sulfate comprising the steps of contacting in a reaction zone solid aluminum containing metallic impurities, simultaneously with an aqueous solution of sulfuric acid and a pool of liquid mercury maintaining said aluminum in contact with said mercury pool, said mercury being operative to cause the rapid dissolution of said solid aluminum and sulfuric acid to liberate the metallic impurities and the hydrogen therein, maintaining said contact for a period of time sufficient to convert said aluminum and sulfuric acid into aluminum sulfate, free said hydrogen and cause the metallic impurities freed from said aluminum to be absorbed by said mercury.

2. A process as defined in claim 1 wherein said mercury containing absorbed mettalic impurities is removed from said reaction zone.

3. A process as defined in claim 1 wherein said mercury is kept in substantial contact with said aluminum and sulfuric acid for substantially the entire period of reaction.

4. A proces as defined in claim 2 wherein said mercury is purified and recycled to said reaction zone.

5. A process as defined in claim 1 wherein the amount of mercury employed is sufficient to substantially cover the bottom portion of said reaction zone.

6. A process as defined in claim 1 wherein said reaction zone has a substantially flat bottom portion.

7. A process as defined in claim 1 wherein said reaction zone is agitated.

8. A process as defined in claim 1 wherein dilute sulfuric acid is used.

9. A process as defined in claim 1 carried out at the boiling point of the reaction mixture.

10. A process as defined in claim 1 carried out at atmospheric pressure.

11. A process as defined in claim 1 wherein there is sufficient amounts of sulfuric acid to react with substantially all of said aluminum.

12. A process as defined in claim 1 further comprising heating said reaction zone.

13. A process as defined in claim 1 carried out batchwise.

14. A process as defined in claim 1 carried out continuously.

15. A process as defined in claim 1 wherein said aluminum sulfate is withdrawn from said reaction zone.

16. A process as defined in claim 13 wherein said mercury subsequent to said reaction is treated to remove said absorbed metallic impurities in said reaction zone.

17. A process as defined in claim 14 wherein said mercury is continuously removed from said reaction zone and treated to remove said absorbed metallic impurities and recycled back thereto 18. A process as defined in claim 1 wherein the level of mercury in said reaction zone is maintained constant.

* * * * *